E. A. HILL.
HANGER AND TROLLEY WHEEL FOR FREIGHT CAR DOORS.
APPLICATION FILED AUG. 7, 1911.
1,008,910.
Patented Nov. 14, 1911.
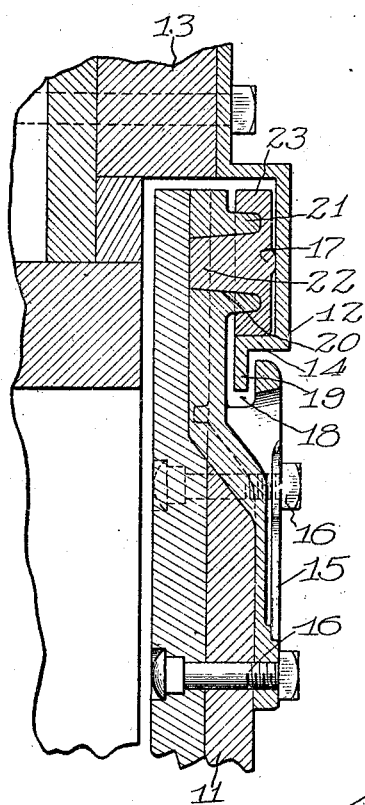
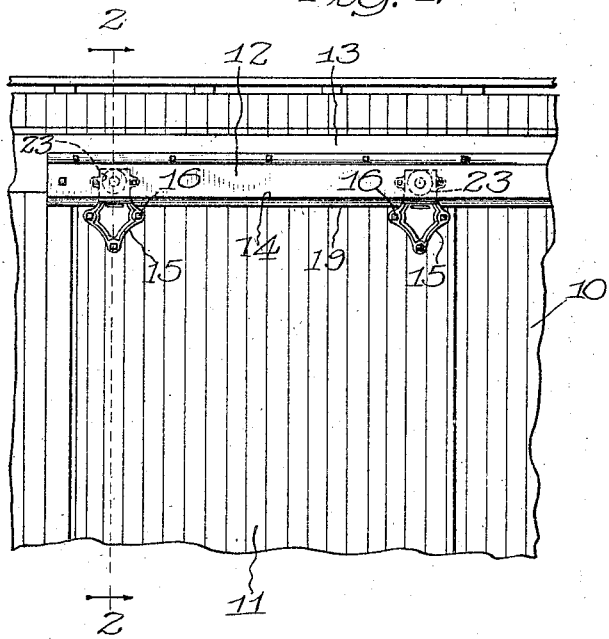
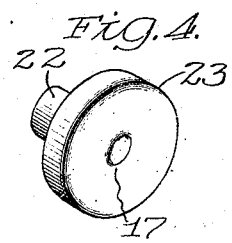
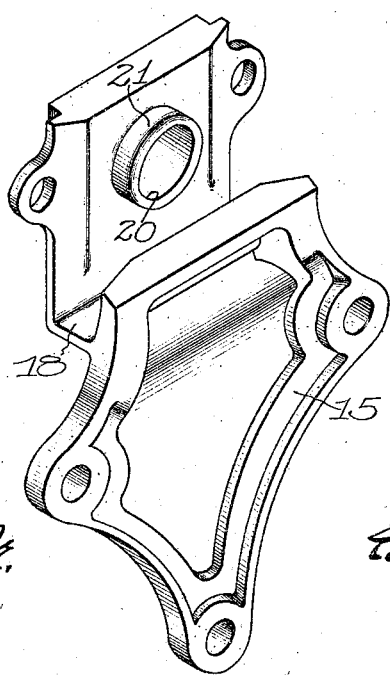
Witnesses:
Inventor:
Edward A. Hill
by J. P. Barnett
Atty.

UNITED STATES PATENT OFFICE.

EDWARD A. HILL, OF CHICAGO, ILLINOIS, ASSIGNOR TO CHICAGO CAR DOOR COMPANY, OF CHICAGO, ILLINOIS, A CORPORATION OF ILLINOIS.

HANGER AND TROLLEY-WHEEL FOR FREIGHT-CAR DOORS.

1,008,910. Specification of Letters Patent. Patented Nov. 14, 1911.

Original application filed June 18, 1910, Serial No. 567,661. Divided and this application filed August 7, 1911. Serial No. 642,601.

*To all whom it may concern:*

Be it known that I, EDWARD A. HILL, a citizen of the United States, residing at Chicago, in the county of Cook and State of Illinois, have invented certain new and useful Improvements in Hangers and Trolley-Wheels for Freight-Car Doors, of which the following is a specification.

My invention relates to a combined hanger and trolley wheel for freight car doors of the sort which are suspended from and run upon a track attached to the car body above the doorway; and the object of the invention is to provide a trolley wheel and hanger of novel form and construction having certain improved features to be hereinafter described and claimed.

Specifically the purpose of the invention is to improve upon the hanger and trolley wheel shown in my Patent No. 942,324 granted December 7, 1909. This patent discloses a combination and arrangement of devices for movably supporting a freight car door consisting of an inturned L section track bar secured to the car body above the doorway, a hanger attached to the face of the door and formed, in the preferred construction shown in Fig. 3, of the patent drawings, with a circular opening, and a trolley wheel with an integral stud or axle which takes its bearing in the opening in the hanger; a salient and important feature of the apparatus being that the wheel is entirely unattached to the hanger, being kept in its place solely by the vertical flange of the L section track bar standing in front of it; this arrangement simplifying, cheapening and strengthening the apparatus, when compared with previously used apparatuses having the same general object, by doing away with the necessity for a separate axle or pivot for the trolley wheel and with the nuts or riveting necessary to secure the wheel thereon. However, the apparatus of the patent, while operative and correct in principle, has not satisfactorily met practical requirements in view, particularly, of the hard usage that all parts and appurtenances of freight cars are subjected to. The track bar, when constructed as shown in the patent, is likely to become bent, or loosened in its attachment so as to allow the door to fall off or run unevenly or improperly. This defect has been cured by providing the horizontal track forming portion of the track bar with a depending flange which fits into a slot in the hanger as shown and claimed in my application Serial No. 567,661, filed June 18, 1910. Another serious defect in the apparatus of Patent 942,324 is in the mounting of the trolley wheel on the hanger.

One of the particular advantages of the apparatus consists in the fact that the parts, the hanger and the trolley wheel, may be simple castings requiring no machining; but as castings cannot be made with perfect accuracy the result is that there is a certain amount of looseness in the bearing of the wheel on the hanger, likely to be increased by wear and the constant jolting and vibration of the car while in motion, which, besides shortening the life of the apparatus may result in the trolley wheels running unevenly and binding in their bearings, whereas it is very desirable that the door should run smoothly and evenly on the track.

The present invention has for its object to improve upon the form and construction of the wheel and hanger shown in the patent so as to obviate the defects above noted and provide a bearing for the wheel on the hanger which will keep the wheel in its true position, even when wheel and hanger are unmachined castings and are kept in engagement one with the other solely by means of the track, as above described.

The invention is illustrated, in a preferred embodiment, in the accompanying drawing, wherein—

Figure 1 is a fragmentary elevation of a car, car door and track showing the door equipped with my improved form of hanger and trolley wheel; Fig. 2, an enlarged sectional view taken on line 2—2 of Fig. 1 looking in the direction of the arrows; Fig. 3, a perspective view of the hanger, and Fig. 4, a perspective view of the trolley wheel.

Like characters of reference indicate like parts in the several figures of the drawings.

Referring to the drawings, 10 designates the side wall of a car, 11 the door, and 12 a track secured to a projecting timber 13 above the door way of the car and formed with an inturned track forming flange 14.

15 designates a hanger which is secured to the front face of the door by the bolts 16, and 17 a trolley wheel. The hanger is formed with a slot 18 and the track bar with a depending flange 19, no claim being laid herein to this feature of the device as it forms the subject matter of my application Serial No. 567,661 referred to above.

The hanger is formed with a circular opening 20 and surrounding the same with an outwardly projecting boss 21. The trolley wheel has the integrally formed stud 22 which fits into the opening 17, as closely as may be, and is formed with the circumferential inwardly projecting flange 23 which overlaps and bears upon the boss 21. In other words, the trolley wheel is in effect grooved to receive the boss on the hanger. With the trolley wheel and hanger so constructed the former takes two bearings on the latter, the stud bearing in the opening and the flange 23 on the projecting boss. Furthermore the bearing between the stud and the hanger is lengthened without either narrowing the tread of the wheel, which would be undesirable, or increasing the effective width of hanger and trolley wheel, which would be equally undesirable. As a result the trolley wheel cannot wabble or bind but runs true on the track.

While I have described a preferred form of my invention it will be clear to those skilled in the art that some change in the form and proportion of the parts might be made without departure from the invention. Therefore I do not limit myself to the particulars shown and described except so far as the same are made limitations upon the claims herein.

No claim is made herein to the track as the track is claimed in the specific form herein shown in my Patent 1,001,030 dated August 22, 1911. of which the present application is a division.

I claim:

1. In apparatus of the character described, the combination with a door hanger adapted to be secured to the outer face of the door and formed with a circular opening and with a boss concentric therewith, of a trolley wheel adapted to run upon a track and having an integrally formed stud which takes a bearing in the opening in said hanger, and a projecting flange which takes a bearing on said boss; the trolley being unattached to the hanger and held in operative position by the track on which it runs, substantially as described.

2. In apparatus of the character described, the combination with a door hanger, of a trolley wheel, one of said two members having a stud and the other an opening into which said stud is received and the said members being formed with circular projections concentric with the stud and opening, one of which overlaps and bears upon the other; the trolley wheel being unattached to the hanger so that it is held in position thereon solely by the track on which it runs, substantially as described.

EDWARD A. HILL.

Witnesses:
P. H. TRUMAN,
L. A. FALKENBERG.